United States Patent
Green (10) Patent No.: US 6,552,355 B1
(45) Date of Patent: Apr. 22, 2003

(54) OPTICAL DETECTION OF ENTRAPPED GAS IN A COOLING SYSTEM

(75) Inventor: Steven R. Green, El Dorado, KS (US)

(73) Assignee: Texaco, Inc., San Ramon, CA (US)

( * ) Notice: Subject to any disclaimer, the term of this patent is extended or adjusted under 35 U.S.C. 154(b) by 0 days.

(21) Appl. No.: 09/445,165

(22) PCT Filed: Jun. 5, 1998

(86) PCT No.: PCT/US98/11793

§ 371 (c)(1),
(2), (4) Date: Jan. 4, 2000

(87) PCT Pub. No.: WO98/55849

PCT Pub. Date: Dec. 10, 1998

Related U.S. Application Data (60) Provisional application No. 60/048,779, filed on Jun. 6, 1997.

(51) Int. Cl.$^7$ ................................................. G01N 21/85
(52) U.S. Cl. ....................... 250/573; 250/564; 356/436; 73/49.1
(58) Field of Search ................................. 250/573, 574, 250/575, 576, 564, 565; 356/436, 437, 441, 442; 73/40.5 R, 45.5, 49.1

(56) References Cited

U.S. PATENT DOCUMENTS

| | | | |
|---|---|---|---|
| 3,935,876 A | 2/1976 | Massie et al. | 137/177 |
| 3,943,965 A | 3/1976 | Matelena | 137/340 |
| 4,126,519 A | 11/1978 | Murray | 201/32 |
| 4,146,369 A | 3/1979 | Flesch et al. | 48/201 |
| 4,159,447 A | 6/1979 | Gernhardt et al. | 324/51 |
| 4,172,857 A | 10/1979 | Pavilon | 585/635 |
| 4,348,338 A | 9/1982 | Martinez et al. | 261/142 |
| 4,371,786 A | 2/1983 | Kramer | 250/343 |
| 4,424,766 A | 1/1984 | Boyle | 122/4 |
| 4,859,864 A | 8/1989 | Smith | 250/577 |
| 4,989,942 A | 2/1991 | Koenigsberg et al. | 350/96.18 |
| 5,033,858 A | 7/1991 | Twerdochlib et al. | 356/436 |
| 5,241,368 A | 8/1993 | Ponstingl et al. | 356/436 |
| 5,259,594 A | 11/1993 | Mayr et al. | 266/157 |
| 5,263,361 A | 11/1993 | Gates | 73/45.5 |
| 5,476,990 A | 12/1995 | Hittner et al. | 588/201 |
| 5,539,386 A | 7/1996 | Elliott | 340/632 |
| 5,607,487 A | 3/1997 | Taylor | 48/111 |
| 5,616,296 A | 4/1997 | Hittner et al. | 266/145 |
| 5,680,111 A | 10/1997 | Danby et al. | 340/632 |

FOREIGN PATENT DOCUMENTS

| | | |
|---|---|---|
| JP | 56112626 | 9/1981 |
| JP | 57055769 | 4/1982 |
| JP | 58075041 | 5/1983 |
| JP | 03011955 | 1/1991 |
| JP | 09089422 | 4/1997 |
| JP | 10048064 | 2/1998 |

*Primary Examiner*—Kevin Pyo
(74) *Attorney, Agent, or Firm*—Frank C. Turner; Morris N. Reinisch; Howrey, Simon, Arnold & White, LLP (57) ABSTRACT

An optical leak detector for use with a cooling system is described. The optical leak detector includes a light source, a light detector, and a conversion device. The light source is optically coupled to the light detector by way of an optical path. The light detector generates an electronic signal in response to light received from the light source. The conversion device, which is attached to the light detector, generates an electronic signal in response to the amount of light received from the light source. This electronic signal can indicate if a leak has occurred in the cooling system by the traversal of a entrapped gas bubble across the optical path formed by the light source and the light detector.

16 Claims, 4 Drawing Sheets

OPTICAL DETECTION OF ENTRAPPED GAS IN A COOLING SYSTEM

This application was filed under 35 U.S.C. § 371 as a national phase application of PCT application number PCT/US98/11793, filed Jun. 5, 1998, which itself claims priority from U.S. provisional application Ser. No. 60/048,779, filed Jun. 6, 1997.

BACKGROUND

Gasification is a partial oxidation process that generates gases from the injection of carbonaceous feed, steam, and oxygen. Feed, steam, and oxygen are injected into the gasification chamber through a feed-injector. Typically, the feed-injector has a feed channel and one or two oxygen channels so that the feed remains isolated from the oxygen until exiting the feed injector at the feed-injector tip. Because gasification is an exothermic process, the temperatures within the gasification chamber typically range from approximately 2000° F. (1093° C.) to approximately 2700° F. (1482° C.).

One knowledgeable in the art should appreciate that the operation of the gasification chamber depends upon the condition and design of the feed-injector. For example if the feed-injector tip is burned or thermally deformed, the slurry and oxygen may mix prematurely which may create inefficient operation of the unit or unsafe operating conditions. In order to reduce the likelihood of damaging the feed-injector tip, a cooling system coupled to a cooling jacket or cooling coils around the tip of the feed injector is used to keep the temperature of the feed-injector tip within a given tolerance range. The presence of a leak in the cooling system, may allow carbon monoxide, synthesis gas or other gases to enter the cooling system because the gas pressure of the reactor is significantly higher than the pressure in the cooling system. As a result of even a very fine leak, significant gas may enter the cooling system and lead to improper cooling of the feed-injector tip and poor reactor performance. Further, the presence of synthesis gas in the cooling system may lead to the build-up of hydrogen and carbon monoxide gas which in turn may lead to explosion within the cooling system. For this reason it should be recognized by one of skill in the art that a detection system to detect entrapped gas caused by leaks in the cooling system is important to the safe and efficient operation of a gasification unit.

One type of conventional gas detection system that attempts to detect leaks utilizes gas sensitive probes to monitor the presence of gases, such as carbon monoxide, air, and so forth in the cooling system. In such a system, the coolant, typically water or treated cooling water, travels through a coolant supply channel and encounters the feed-injector tip and becomes hot and in turn travels through a coolant return channel. The hot coolant is routed back to a heat exchanger where the heat is removed and the coolant is returned to the coolant supply channel for further use. A leak in the system may cause gases to be entrapped into the cooling system, especially if the leak occurs at the feed injector. When gas is entrapped in the cooling system, the gas bubbles can be caused to naturally float upward into a leak detection channel which is an alternative branch of the return channel. Ideally the amount of gas is detected by a gas sensor located at a high point or at the top of the leak detection channel. In the presence of gas, the gas sensor generates an electronic signal that could be routed to a control system; the control system could activate an alarm if the amount of gas present indicates that a leak has occurred within the cooling system and corrective action may be taken.

Under ideal circumstances, such a gas detection system would detect a leak in the coolant system before the feed-injector tip becomes damaged. In reality, the above described gas detection system has difficulty detecting a leak because it is extremely difficult to remove all of the gas from the cooling system. Thus, it is not uncommon that the gas sensor becomes saturated even when there are no leaks in the cooling system. One of skill in the art should understand that the saturation of the gas sensor makes the detection of gas entrapped by leaks in the cooling system very difficult.

Alternatively one can carefully monitor the pH of the coolant for changes that may be due to the entrapment of gas and thus leaks. However, the use of such a system is limited to situations in which acidic gas, such as carbon dioxide, hydrogen sulfide, nitrogen oxides, sulfur oxides, etc. are being entrapped in the cooling system. An additional limitation is that coolant solutions, especially aqueous coolants, are often treated with basic compounds so as to minimize corrosion. One of skill in the art would readily appreciate that the entrapped acidic gases may react with the corrosion prevention treatments and thus the leak may go undetected for a considerable amount of time.

Thus, it would be beneficial to have an apparatus and method for detecting leaks in a cooling system that is capable of overcoming the shortcomings of conventional detection methods.

SUMMARY OF THE INVENTION

The present invention is generally directed to an optical gas detector for use in cooling systems, particularly cooling systems associated with a gasification unit. In one illustrative embodiment, the detection system includes a light source, a light detector, a conversion devise, and a control system. The light source should be operatively coupled to a first optical fiber the first optical fiber connecting the light source to a first probe the first probe being functionally effective to transmit light. The light detector should be coupled to a second optical fiber, the second optical fiber connecting the light detector to a second probe, the second probe being functionally effective to receive light from the light source. The conversion device should be operatively coupled to the light detector, the conversion device generating an adjusted electronic signal in response to the light emitted by the light source and received by the light detector. The control system receives the adjusted electronic signal from the conversion device with the control system functionally responding to the electronic signal to provide an indication of at least one leak in the pressurized cooling system. The detection of the leak is due to the variability of the adjusted electronic signal with traversal of a gas bubble across an optical path formed between the light source and the light detector. In one illustrative embodiment, at least one of the probes is selected from a group consisting of a high-pressure probe, a high-temperature probe and a high-pressure high-temperature probe and preferably at least one of the probes is a sapphire probe. In another embodiment the light source may be a coherent light source or it may be a collimated light source that is not coherent. The light detector may be selected from the group including a photodiode, phototransistor, photomultiplier tube, and a charged-coupled device.

DESCRIPTION OF ILLUSTRATIVE EMBODIMENTS

Figure 1:
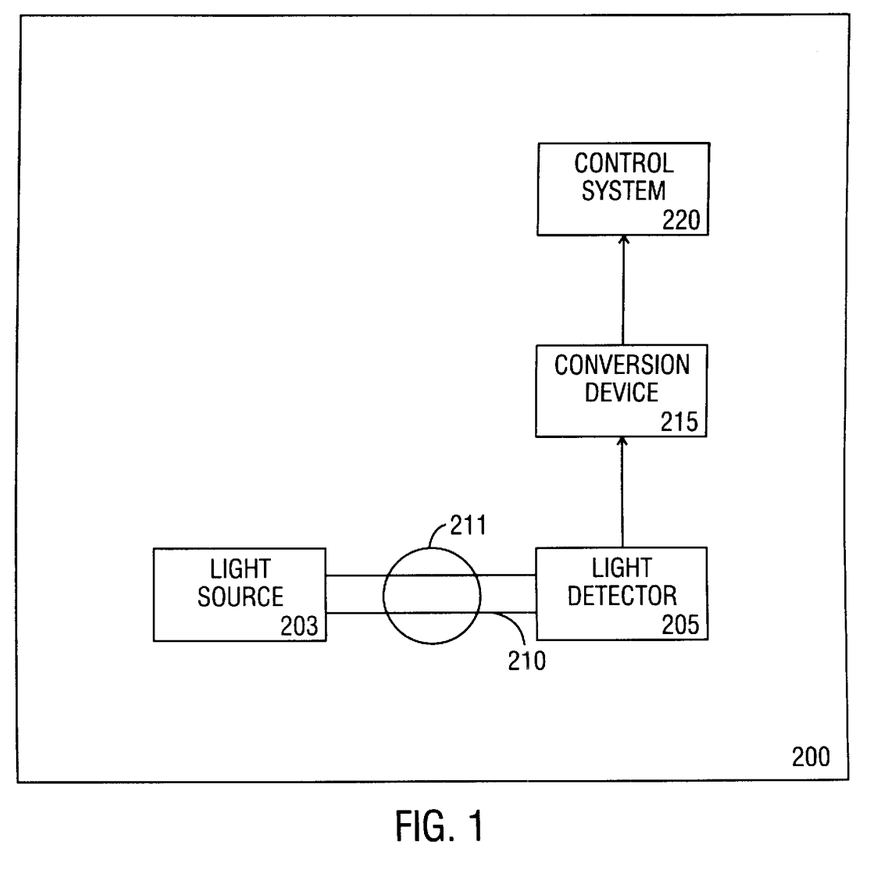
FIG. 1 illustrates some of the components in a optical gas detection system in accordance with the invention.

FIG. 1 illustrates some of the components of an optical gas detector 200 in accordance with the invention. Light source 203 is aligned with light detector 205 such that an optical path 210 is formed between them. The optical path 210 transverses a coolant channel 211, which is defined by a coolant channel pipe through which coolant flows. The coolant may be any fluid that is suitable for such use including aqueous solutions in which corrosion treatment compounds have been dissolved. Light source 203 may be any type of coherent or incoherent source of electromagnetic radiation (e.g., a laser or a xenon lamp). If an incoherent light source is used, it is preferred that it be collimated by conventional collimating means such as lenses or apertures. Light detector 205 may be any type of conventional light detector (e.g., a photodiode, a phototransistor, a photomultiplier tube, or a charge coupled device). Light detector 205 generates an electronic signal corresponding to the amount of light received from light source 203. Conversion device 215 converts the electronic signal received from light detector 205 into an adjusted electronic signal (e.g., 4–20 mA electronic signal) which is routed to a control system 220.

If a leak develops within a cooling system, gases can enter the cooling system when the pressure of the gas is greater than the pressure of the cooling system. For example, the pressure of the gas in a gasifier reactor is much higher than the pressure in the cooling jacket or cooling coils employed to cool the feed injector tip. The presence of gas in the cooling system generate bubbles in the coolant and thus in the coolant channel. Thus, the detection of bubbles within the coolant channel can indicate the presence of a leak in the cooling system. For example, the present invention utilizes the detection of bubbles in the coolant as an early indicator of a leak in the cooling jacket or cooling coils of the feed injector tip. If bubbles are detected, the control system compares the difference between the received signal to a reference signal to determine if there is a leak. If the comparison indicates a leak, the control system activates an alarm to alert operations personnel to the presence of a leak.

Figure 2:
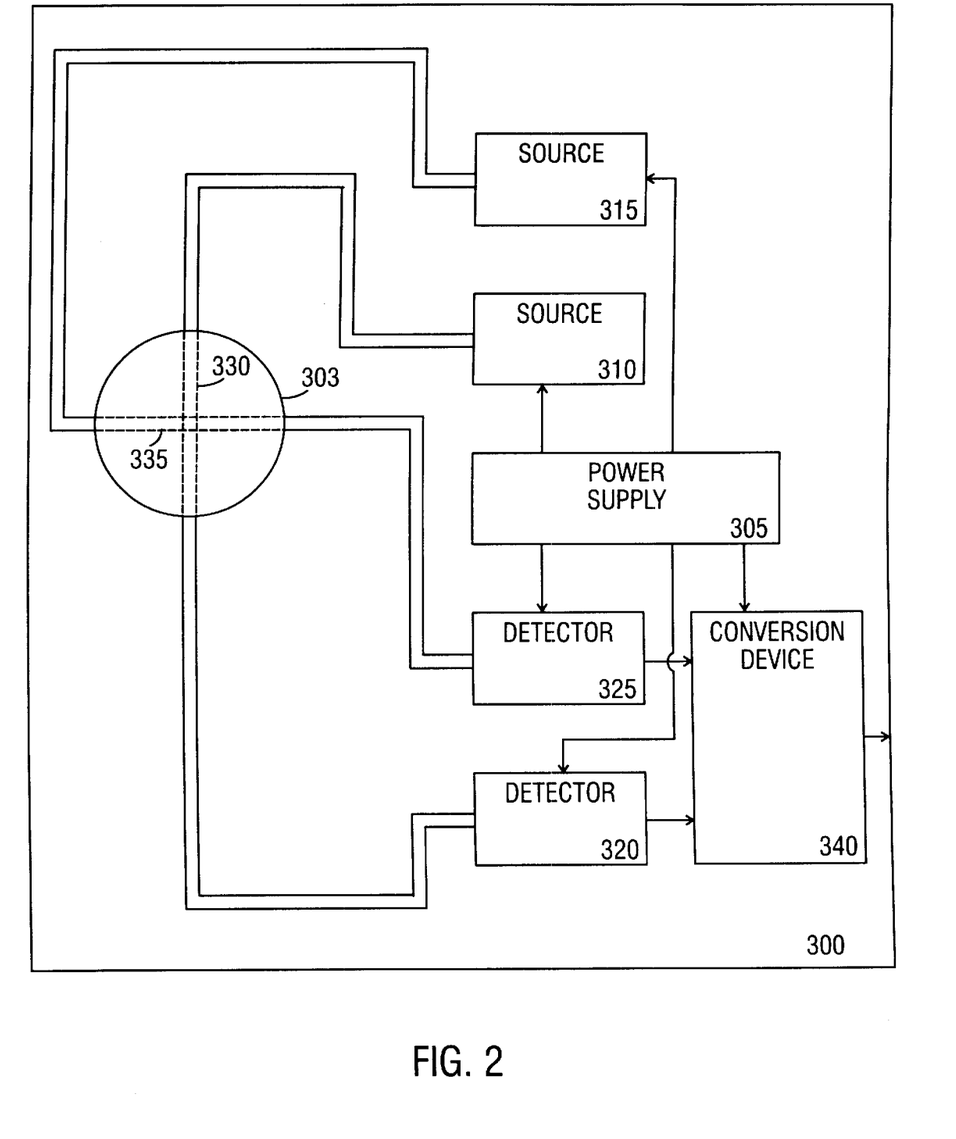
FIG. 2 illustrates a exemplary embodiment of the invention for a high-pressure cooling system.

FIG. 2 illustrates an embodiment of the invention used in a high-pressure cooling system 300. High pressure as used in this application means pressures from approximately 400 to approximately 1000 psig. The high-pressure system includes channel pipe 303, power supply 305, light source 310, light source 315, detector 320, detector 325, and conversion device 340.

Channel pipe 303 encloses the coolant channel through which coolant flows in the cooling system. FIG. 2 illustrates a cross-sectional view of the channel pipe. The channel pipe is designed with four threaded orifices (not shown) in which the light probes, or alternatively the light sources and detectors themselves, are connected.

A light source/light detector pair (e.g., 310 and 320) are connected in opposing orifices such that they form optical path 330. Similarly, light source 315 and light detector 325 form optical path 335. Any object that traverses an optical path will scatter the light in multiple directions. One skilled in the art will realize that the number and the placement of the pairs of orifices in FIG. 2 has been done for illustrative purposes.

The light sources and light detectors of FIG. 2 are connected to the channel pipe via four conventional optical fibers. The interface between the channel pipe and the optical fibers are probes should be conventional connectors used for such purposes and are not shown. The probes are conventional sapphire probes that can be selected to have either a high-pressure, high-temperature, or high-pressure, high-temperature tolerance. High-temperature as used in this application relates to temperatures greater than the atmospheric boiling point of water and preferably values greater than approximately 500° F. (260 C). The use of probes and optical fibers allows the remote placement of the light sources and light detectors. However, an alternative embodiment could result from directly connecting the light sources and detectors to the channel pipe. In another alternative embodiment, a laser diode is utilized as the light source and a feedback loop including a beam-splitter and detector may be used to prevent the attenuation of the laser diode overtime. In such an arrangement, the initial laser beam generated from the laser diode is split and part is used to detect leaks while the other part is reflected back to a detector. The signal from the detector may be amplified and used in a feedback system to the laser diode power supply so as to maintain a constant intensity of light. In this manner, the attenuation of the light source overtime may be reduced. A band pass filter in front of the light detector may also be utilized in the present invention to prevent stray or scattered light from reaching the detector.

Figure 3:
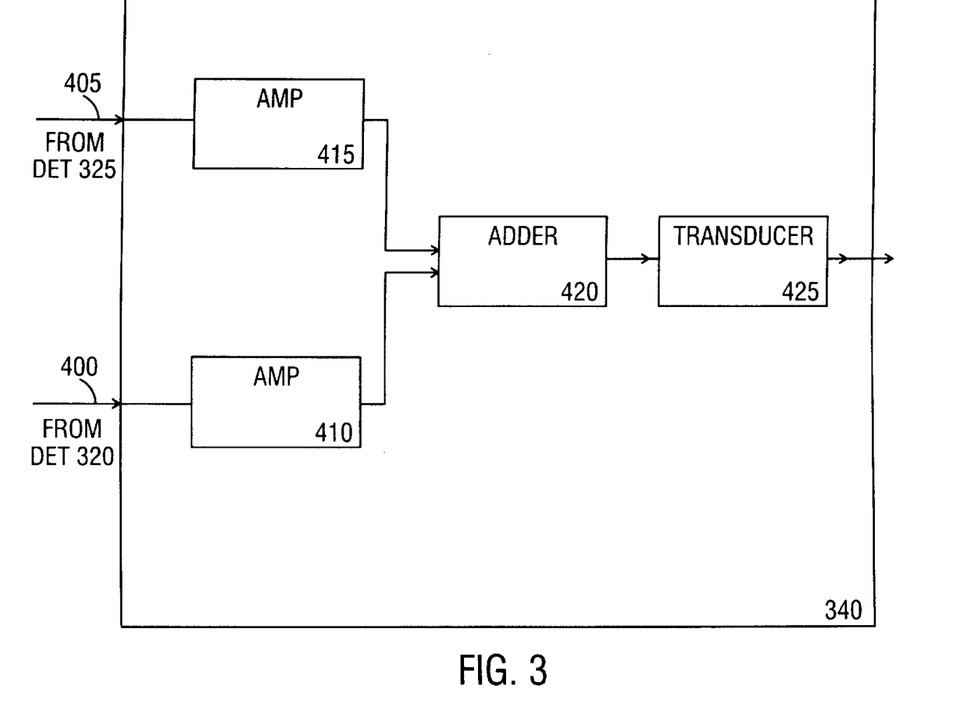
FIG. 3 illustrates a conversion device used in the embodiment shown in FIG. 2.

Each of the detectors (i.e., detector 320 and detector 325) is connected to conversion device 340 which receives signals corresponding to the amount of light detected. FIG. 3 shows an enlarged view of conversion device 340. The conversion device receives a signal from detector 320 along line 400 and a signal from detector 325 along line 405. Conversion device 340 includes amplifiers 410 and 415, adder 420, and transducer 425.

Amplifier 410 amplifies the electronic signal received from detector 320 along line 400; similarly, amplifier 415 amplifies the electronic signal received from detector 325 along line 405. The two amplified signals are sent to adder 420. Adder 420 combines the two amplified signals to generate a combined electronic signal which is routed to transducer 425. Although shown with two amplifiers, one of skill in the art would understand that depending on the signal received from the light detectors, that less than two amplifiers may be used. The transducer generates an adjusted electronic signal (e.g., a 4–20 mA signal) which can be routed to a control system (not shown). The control system can analyze the signal received from the transducer to determine if a leak is present in the cooling system. If the control system has determined that a leak is present, an appropriate alarm can be activated before the feed-injector tip becomes damaged.

Leaks in the cooling system cause bubbles to form in the coolant channel. If bubbles are present within channel pipe 303, it becomes likely that they will traverse either optical path 330 or optical path 335. When optical path 330 is unobstructed (i.e., there are no bubbles in the path), the majority of the light emitted from light source 310 is received by detector 320. If bubbles traverse optical path 330, they will scatter the light emitted from light source 310. Scattering causes the emitted light to travel in multiple directions; thus, detector 320 will receive less light because only a small portion of the light will be in the direction of detector 320. Similar results occur when a bubble traverses optical path 335.

The detection of a smaller amount of light causes the electronic signal generated by detector 320 to be smaller.

Thus, a smaller signal is amplified and a smaller signal is generated by the transducer. The difference between signals from an unobstructed optical path and signals from an obstructed optical path can be compared by a control system. If the signal differential is greater than a specified value, the bubbles indicate the presence of a leak in the cooling system. The control system activates an alarm in response to the detection of a leak.

The previous example was given for illustrative purposes. Thus one skilled in the art will realize that both light source/light detector pairs could be used simultaneously to indicate if a leak is present in the cooling system. Simultaneous use of both light detectors (i.e., 320 and 325) would provide better resolution enabling more efficient detection of a slow leak which generates fewer bubbles.

Figure 4:
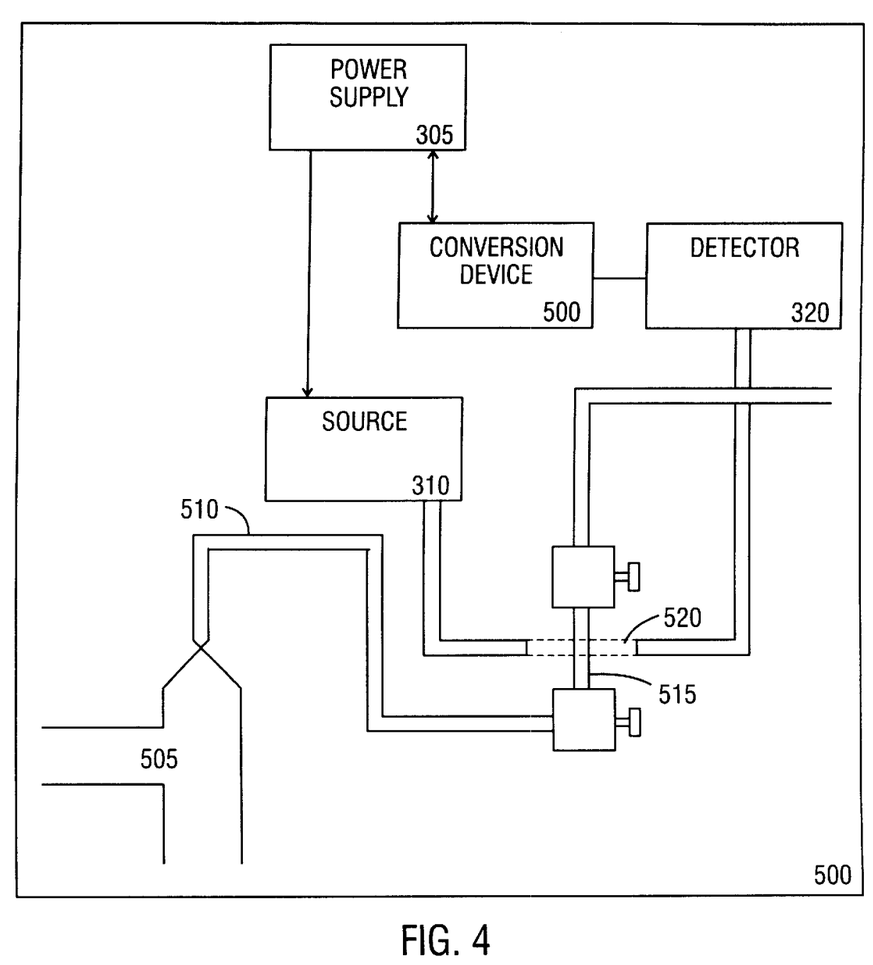
FIG. 4 illustrates another illustrative embodiment of the invention for a low-pressure cooling system.

A second embodiment of the invention which can be used in a low-pressure cooling system 500 is illustrated in FIG. 4. Low pressure as defined in this application relates to pressures less than approximately 400 psig. The low-pressure system includes coolant channel 505, escape path 510 power supply 305, light source 310, light detector 320, conversion device 500, and sight tube 515.

The low-pressure system functions similarly to the high-pressure system. A portion of coolant channel 505 is shown in FIG. 4 with escape path 510 which allows some fluid to leave the coolant channel. A sight tube 515 is connected to escape path 510. Light source 310 and light detector 320 are placed on opposite sides of the sight tube such that optical path 520 is formed; a portion of optical path 520 is within sight tube 515. Conversion device 500 includes an amplifier and a transducer. When the electronic signal generated by detector 320 is received by conversion device 510, the electronic signal becomes amplified and converted into an adjusted electronic signal (e.g., a 4–20 mA signal) that can be received by the main control system (not shown).

Leaks in the cooling system cause bubbles to form in the coolant channel. If bubbles are present within coolant channel 505, it becomes likely that a portion of them will be within the liquid in escape path 510. Any bubbles within escape path 510 will pass through sight tube 515 and traverse optical path 520. As mentioned above, traversal of the optical path varies the amount of light received by detector 320 and alters the corresponding electronic signal generated. A control system analyzes the signal differential corresponding to the amount of light received with bubbles in the optical path to the amount of light received without bubbles in the optical path. If the signal differential is greater than a specified value, the control system activates an alarm because a leak has been detected.

The present invention uses bubbles as indicators; the detection of bubbles provide early detection of leaks in a pressurized cooling system for a gasification unit. As previously noted very small leaks within a cooling jacket or coils of a feed injector enable gas to enter the cooling system. The resulting bubbles in the coolant will significantly affect the transmission of light through the coolant. Thus, slow and/or very small leaks can be detected which results in a safer operation of the gasification system. The present invention also allows the detection of various types of gases (e.g., carbon monoxide and hydrogen) which may have entered the coolant channel through the feed-injector tip or in the synthesis gas cooling heat exchangers.

One of skill in the art would appreciate and understand, however, that the gas detection system of the present invention need no be limited to use on cooling systems associated with synthesis gas reactors. As previously noted, in any situation in which the gas surrounding the cooling coils, heat exchangers, cooling jackets etc. is greater than the pressure inside the cooling system, gas will be entrapped in the cooling system. Not only does the entrapment of gas in the cooling system reduce the efficiency of the cooling system, depending on the gas it may cause other safety issued to arise. Thus one of skill in the art should appreciate and understand that the gas detection system of the present invention may be used in any of these situations in which cooling systems are at a lower pressure than the surrounding gas.

In addition, the present invention does not require significant amounts of additional piping. In each of the disclosed embodiments, the invention utilizes pre-existent piping. Finally, the components of the present invention are common and relatively inexpensive. The cost associated with the light sources and light detectors reduces the equipment cost of the cooling system by more than five percent over conventional cooling systems equipped with gas monitoring equipment.

In view of the above disclosure, one of skill in the art should appreciate that one illustrative embodiment of the present invention is an optical leak detector for use in a pressurized cooling system in which the cooling system includes at least one coolant channel through which coolant flows. The detector includes a light source, a light detector, a conversion device and a control system. The light source should be operatively coupled to a first optical fiber which connects the light source to a first probe, the first probe being functionally effective to transmit light. Preferably the light source is a coherent light source such as a laser, but it may also be a non-coherent light source that is collimated to form a beam of light. The light detector should be coupled to a second optical fiber, the second optical fiber connecting the light detector to a second probe which should be functionally effective to receive light from the light source. Preferably the probes may be selected from a group including a high-pressure probe, a high-temperature probe and a high-pressure high-temperature probe, more preferably the probe may be a sapphire probe resistant to high pressure and temperature and the other properties of the coolant. The light detector may be selected from the group including a photodiode, phototransistor, photomultiplier tube, and a charged-coupled device. The conversion device should be operatively coupled to the light detector. The conversion device generates an adjusted electronic signal in response to the light emitted by the light source and received by the light detector. The adjusted electronic signal functionally varies with traversal of a bubble in the coolant across an optical path formed between the light source and the light detector. In one preferred embodiment, the conversion device includes an amplifier coupled to the first light detectors, the amplifier being functionally effective at amplifying electronic signals from the light detectors. The conversion devise further includes a transducer coupled to the amplifier, the transducer should be functionally effective to receive the electronic signal from amplifier and generate the adjusted electronic signal for the control system. The adjusted electronic signal from the conversion device is received by the control system which functionally responds to the electronic signal to provide an indication of a leak in the cooling system.

Another illustrative embodiment of the present invention is an optical leak detector for a low-pressure cooling system, the low-pressure cooling system including at least one coolant channel through which coolant flows. The optical leak detector includes a light source, a light detector, an escape tube, a conversion device and a control system. The light source should be operatively coupled to a first optical fiber which connects the light source to a first probe which is functionally effective to transmit light. Preferably the light source should be a coherent light source, however it may also be a non-coherent light source which has been collimated. The light detector should be coupled to a second optical fiber, the second optical fiber connecting the light detector to a second probe. The second probe should be functionally effective to receive light from the light source and transmit it to the light detector. Preferably, the light detector should be selected from the group including a photodiode, phototransistor, photomultiplier tube, and a charged-coupled device. The escape tube is coupled to the cooling channel and functionally effective to receive coolant and any entrapped bubbles from the coolant channel. Further the escape tube should be positioned between the first and the second probes and intersecting at least part of the optical path formed between the two probes. Preferably the escape tube is a high-pressure sight tube. The conversion device should be, operatively coupled to the light detector, the conversion device generating an adjusted electronic signal in response to light emitted by the light source and received by the light detector. Preferably the conversion device includes an amplifier coupled to the first light detector, the amplifier should be functionally effective at amplifying electronic signals from the light detector; and a transducer coupled to the amplifier, the transducer should be functionally effective to receive the electronic signal from amplifier and generate the adjusted electronic signal for the control system. Because the adjusted electronic signal functionally varies with traversal of a bubble in the coolant across an optical path formed between the light source and the light detector, entrapped air or gas may be detected. The adjusted electronic signal is sent to the which functionally responds to the adjusted electronic signal to provide an indication of a leak in the low-pressure cooling system. The control system may then trigger an alarm and take automated and preprogrammed corrective action as needed.

Yet another illustrative embodiment of the present invention is an optical leak detector for a high-pressure cooling system, especially such a system as used in a gasification unit. The cooling system should include at least one cooling channel through which coolant flows, however it may contain may such channels. The optical leak detector of the present illustrative embodiment includes: a first light source, a first light detector, a second light source, a second light detector, a channel pipe, which defines the cooling channel, a conversion device and a control system. The first light source should be operatively coupled to a first optical fiber which connects the first light source to a first probe, the first probe being functionally effective to transmit light. The first light detector should be coupled to a second optical fiber, the second optical fiber connecting the first light detector to a second probe, the second probe being functionally effective to receive light from the first light source. The first light source is optically coupled to the first light detector by an optical path which is created between the two within the cooling channel. The second light source should be operatively coupled to a third optical fiber which connects the second light source to a third probe. The third probe, like the first probe should be functionally effective to transmit light. The second light detector should be coupled to a fourth optical fiber, the fourth optical fiber connecting the second light detector to a fourth probe. Like the second probe, the fourth probe should be functionally effective to receive light from the second light source. The second light source is optically coupled to the second light detector by an second optical path which is created between the two within the cooling channel. The second optical path may be parallel, perpendicular or in a different plane that the first optical path described above. The light sources may be coherent light sources such as lasers, or they may be non-coherent light sources that have been collimated into beams of light. As previously noted, the channel pipe defines the coolant channel, but it also serves to align the light source probes with the light detection probes. Thus the channel pipe has four threaded orifices, the threaded orifices operatively coupled to the probes and aligning the probes as described above. The probes may be selected from a group consisting of a high-pressure probe, a high-temperature probe and a high-pressure high-temperature probe, but preferably the probes are sapphire probes which are capable of withstanding the high pressures and temperatures encountered. The conversion device should be operatively coupled to the both the first and the second light detector. The role of the conversion device is to generate an adjusted electronic signal in response to light emitted by the light sources and received by the light detectors. The adjusted electronic signal functionally varies with traversal of a bubble in the coolant across one or both of the optical paths formed between the light sources and the light detectors. Preferably the conversion device includes at least two amplifiers coupled to the first and second light detectors, the amplifiers being functionally effective at amplifying electronic signals from the first and second light detectors. Preferably the light detectors are selected from the group consisting of a photodiode, phototransistor, photomultiplier tube, and a charged-coupled device. The conversion device further includes an adder which should be functionally effective to generate a combined electronic signal in response to adding an electronic signal from the first light detector to an electronic signal from the second light detector. In addition the conversion device includes a transducer coupled to the adder, the transducer should be functionally effective to receive the combined electronic signal from the adder and generate the adjusted electronic signal for the control system. The control system receives the adjusted electronic signal from the conversion device and functionally responds to the electronic signal to provide an indication of at least one leak in the high-pressure cooling system. This response may include the triggering of alarms and the automated predetermined actions needed in response.

Further, one of skill in the art should understand and appreciate that the present invention also encompasses a method of optically detecting leaks in a cooling system. Such a method includes: transmitting light from a light source; detecting light transmitted from the light source; generating an adjusted electronic signal in response to detected light; and analyzing the electronic signal to determine if a leak is present in the cooling system. Because the adjusted electronic signal functionally varies with traversal of a bubble in the coolant across an optical path formed between the light source and the light detector, the electronic signal may be analyzed by a control system and if necessary the control system activates an alarm indicating a leak in the cooling system. In the practice of such a method, the light source is a coherent light source or it may be an incoherent light source which has be collimated. The light detector utilized in the method may be a photodiode, phototransistor, photomultiplier tube, or a charged-coupled device.

It will be appreciated by those of ordinary skill in the art having the benefit of this disclosure that numerous variations from the foregoing illustration will be possible without departing from the inventive concept described therein. Accordingly, it is the claims set forth below, and not merely the foregoing illustration, which are intended to define the exclusive rights claimed.

What is claimed is:

1. An optical leak detector for use in a pressurized cooling system, the pressurized cooling system including at least one coolant channel through which coolant flows, the detector comprising:

a light source, the light source being operatively coupled to a first optical fiber the first optical fiber connecting the light source to a first probe the first probe being functionally effective to transmit light;

a light detector, the light detector being coupled to a second optical fiber, the second optical fiber connecting the light detector to a second probe, the second probe being functionally effective to receive light from the light source;

a conversion device, the conversion device being operatively coupled to the light detector, the conversion device generating an adjusted electronic signal in response to the light emitted by the light source and received by the light detector, wherein the adjusted electronic signal functionally varies with traversal of a bubble in the coolant across an optical path formed between the light source and the light detector; and a control system for receiving the adjusted electronic signal from the conversion device, the control system functionally responding to the adjusted electronic signal to provide an indication of at least one leak in the pressurized cooling system;

wherein the pressure in the pressurized cooling system is between approximately 400 psi and approximately 1000 psi and wherein at least one of the probes is selected from the group consisting of a high-pressure probe, a high-temperature probe and a high-pressure high-temperature probe.

2. The optical leak detector of claim 1 wherein at least one of the probes is a sapphire probe.

3. The optical leak detector of claim 1 wherein the light source is a coherent light source.

4. The optical leak detector of claim 1 wherein the light detector is selected from the group consisting of a photodiode, phototransistor, photomultiplier tube, and a charged-coupled device.

5. The optical leak detector of claim 1 wherein the conversion device comprises:

an amplifier coupled to the first light detector, the amplifier being functionally effective at amplifying electronic signals from the light detector; and a transducer coupled to the amplifier, the transducer being functionally effective to receive the electronic signal from amplifier and generate the adjusted electronic signal for the control system.

6. An optical leak detector for a low-pressure cooling system, the low-pressure cooling system including at least one coolant channel through which coolant flows, the optical leak detector comprising:

a light source, the light source being, operatively coupled to a first optical fiber, the first optical fiber connecting the light source to a first probe, the first probe being functionally effective to transmit light;

a light detector, the light detector being coupled to a second optical fiber, the second optical fiber connecting the light detector to a second probe, the second probe being functionally effective to receive light from the light source;

an escape tube, the escape tube being operatively coupled to the cooling channel and functionally effective to receive coolant and any entrapped bubbles from the coolant channel, the escape tube being positioned between the first and the second probes;

a conversion device, the conversion device being, operatively coupled to the light detector, the conversion device generating an adjusted electronic signal in response to light emitted by the light source and received by the light detector, wherein the adjusted electronic signal functionally varies with traversal of a bubble in the coolant across an optical path formed between the light source and the light detector; and.

a control system for receiving the adjusted electronic signal from the conversion device, the control system functionally responding to the adjusted electronic signal to provide an indication of at least one leak in the low-pressure cooling system.

7. The optical leak detector of claim 6 wherein the escape tube is a high-pressure sight tube.

8. The optical leak detector of claim 6 wherein the light source is a coherent light source.

9. The optical leak detector of claim 6 wherein the light detector is selected from the group consisting of a photodiode, phototransistor, photomultiplier tube, and a charged-coupled device.

10. The optical leak detector of claim 6 wherein the conversion device comprises:

an amplifier coupled to the first light detector, the amplifier being functionally effective at amplifying electronic signals from the light detector; and a transducer coupled to the amplifier, the transducer being functionally effective to receive the electronic signal from amplifier and generate the adjusted electronic signal for the control system.

11. An optical leak detector for a high-pressure cooling system, the cooling system including at least one cooling channel through which coolant flows, the optical leak detector comprising:

a first light source, the first light source being operatively coupled to a first optical fiber, the first optical fiber connecting the first light source to a first probe, the first probe being functionally effective to transmit light;

a first light detector, the first light detector being coupled to a second optical fiber, the second optical fiber connecting the first light detector to a second probe, the second probe being functionally effective to receive light from the first light source;

a second light source, the second light source being operatively coupled to a third optical fiber, the third optical fiber connecting the second light source to a third probe, the third probe being functionally effective to transmit light;

a second light detector, the second light detector being coupled to a fourth optical fiber, the fourth optical fiber connecting the second light detector to a fourth probe, the fourth probe being functionally effective to receive light from the second light source;

a channel pipe, the channel pipe defining the coolant channel, the channel pipe having four orifices, the orifices operatively coupled to the probes;

a conversion device, the conversion device being operatively coupled to the both the first and the second light detector, the conversion device generating an adjusted electronic signal in response to light emitted by the light sources and received by the light detectors, wherein the adjusted electronic signal functionally varies with traversal of a bubble in the coolant across an optical path formed between the light source and the light detector; and a control system for receiving the adjusted electronic signal from the conversion device, the control system functionally responding to the adjusted electronic signal to provide an indication of at least one leak in the high-pressure cooling system;

wherein the pressure in the pressurized cooling system is between approximately 400 psi and approximately 1000 psi and wherein at least one of the probes is selected from the group consisting of a high-pressure probe, a high-temperature probe and a high-pressure high-temperature probe.

12. The optical leak detector of claim 11 wherein the conversion device comprises:

at least two amplifiers coupled to the first and second light detectors, the amplifiers being functionally effective at amplifying electronic signals from the first and second light detectors;

an adder being functionally effective to generate a combined electronic signal in response to adding an electronic signal from the first light detector to an electronic signal from the second light detector; and a transducer coupled to the adder, the transducer being functionally effective to receive the combined electronic signal from the adder and generate the adjusted electronic signal for the control system.

13. The optical leak detector of claim 11 wherein the light source is a coherent light source.

14. The optical leak detector of claim 11 wherein the light detector is selected from the group consisting of a photodiode, phototransistor, photomultiplier tube, and a charged-coupled device.

15. The optical leak detector of claim 11 wherein at least one of the probes is a sapphire probe.

16. A method for optically detecting leaks in the flowing coolant of a pressurized cooling system, said method including:

using a first probe for transmitting light from a light source through said flowing coolant; using a second probe connected to a light detector for receiving light from said light source;

generating an adjusted electronic signal from said light detector in response to the transmitted light, wherein said adjusted electronic signal functionally varies with the traversal of a bubble in the flowing coolant across an optical path formed between the light source and the light detector; and analyzing the adjusted electronic signal to determine if a leak is present in the cooling system; wherein the pressure in the pressurized cooling system is between approximately 400 psi and approximately 1000 psi and wherein at least one of the probes is selected from the group consisting of a high-pressure probe, a high-temperature probe and a high-pressure high-temperature probe.

\* \* \* \* \*